(12) United States Patent
Kumar

(10) Patent No.: US 7,822,734 B2
(45) Date of Patent: Oct. 26, 2010

(54) SELECTING AND PRESENTING USER SEARCH RESULTS BASED ON AN ENVIRONMENT TAXONOMY

(75) Inventor: Amit Kumar, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 290 days.

(21) Appl. No.: 11/638,057

(22) Filed: Dec. 12, 2006

(65) Prior Publication Data

US 2008/0140637 A1 Jun. 12, 2008

(51) Int. Cl.
G06F 7/00 (2006.01)
(52) U.S. Cl. .................... 707/708; 707/731
(58) Field of Classification Search ............ 707/3, 707/708, 731
See application file for complete search history.

(56) References Cited

U.S. PATENT DOCUMENTS

| 6,704,729 B1 * | 3/2004 | Klein et al. ............ 707/5 |
| 7,447,677 B2 * | 11/2008 | Milligan et al. ............ 1/1 |
| 2003/0212673 A1 * | 11/2003 | Kadayam et al. ............ 707/3 |
| 2003/0220913 A1 * | 11/2003 | Doganata et al. ............ 707/3 |
| 2004/0093326 A1 * | 5/2004 | Carson et al. ............ 707/3 |
| 2004/0193506 A1 * | 9/2004 | Zmolek ............ 705/27 |
| 2006/0122979 A1 * | 6/2006 | Kapur et al. ............ 707/3 |
| 2006/0122994 A1 * | 6/2006 | Kapur et al. ............ 707/4 |

\* cited by examiner

*Primary Examiner*—Wilson Lee
*Assistant Examiner*—Michael Le
(74) *Attorney, Agent, or Firm*—Hickman Palermo Truong & Becker LLP; Deborah L. Caswell

(57) ABSTRACT

A search engine stores different taxonomies that each specifies categories and relationships between the categories. When the search engine receives a request having a search query, the search engine determines which taxonomy, if any, it should use to generate a search engine results page. The search engine bases this determination upon information provided to it in the request, in one embodiment. For example, the search engine might select a taxonomy based on the particular environment from which the search query originated. However, the search engine can select the taxonomy based on other information, such as a role of the user. Thus, a medical researcher and a financial analyst for a particular corporation could receive search engine results pages that were generated with appropriate taxonomies for each of them.

22 Claims, 5 Drawing Sheets

SELECTING AND PRESENTING USER SEARCH RESULTS BASED ON AN ENVIRONMENT TAXONOMY

FIELD OF THE INVENTION

The present invention relates to computer systems, and more particularly to generating search engine results pages that are based, at least in part, on a taxonomy associated with an environment from which a search query originated.

BACKGROUND

A search engine returns search results that match a search query submitted by a user. Typically, the search engine orders the search results. The order usually takes the form of a "ranking", where the document with the highest ranking is the document considered most likely to satisfy the interest reflected in the search criteria specified by the user. Once the matching documents have been determined, and the display order of those documents has been determined, the search engine sends to the user that issued the search a "search engine results page" that presents information about the matching documents in the display order. Typically, the number of documents that match a search is so large that the user is presented with a search engine results page that only displays information about the top N ranking documents, where N may be significantly smaller than the total number of matching documents. The search engine results page typically includes a control that allows the user to retrieve information about the "next N" matching documents, in case the first N matching documents do not entirely satisfy the user's interest.

Thus, search results are typically generic in that the same search results are sent to all users. Unfortunately, the search results that have the highest ranking may not correlate well with the search results in which a particular user is interested. Thus, a user might have to wade through many pages of search results to locate results of interest. Worse yet, the search results in which a particular user is interested might have such a low ranking that the user does not find them at all.

An alternative to this technique is "taxonomy-based" searching. Briefly, a taxonomy describes categories and relationships between categories. Typically, each document (e.g., search result) is placed into a taxonomy category, which can improve the search result quality.

One type of taxonomy based searching is based on documents from a local database. Taxonomies based on local databases are sometimes specific to particular subject matter. For example, in a medical taxonomy the categories and relationships between categories reflect medical subject matter. As a particular example, a pharmaceutical company might develop a taxonomy for documents in its own databases. However, because the taxonomy only categorizes documents from the local databases, more general search results from the World Wide Web are not included.

Another technique might allow for categorizing search results from the World Wide Web into a taxonomy. However, this technique typically imposes a single general taxonomy upon all users. For example, a search engine might organize search results into a single general taxonomy that applies to all search queries. As a consequence, user's specific needs, such as medical related searches or stock market related searches do not benefit from the general taxonomy.

In view of the foregoing, improved techniques are needed for organizing search results are presenting search engine result pages to a user.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
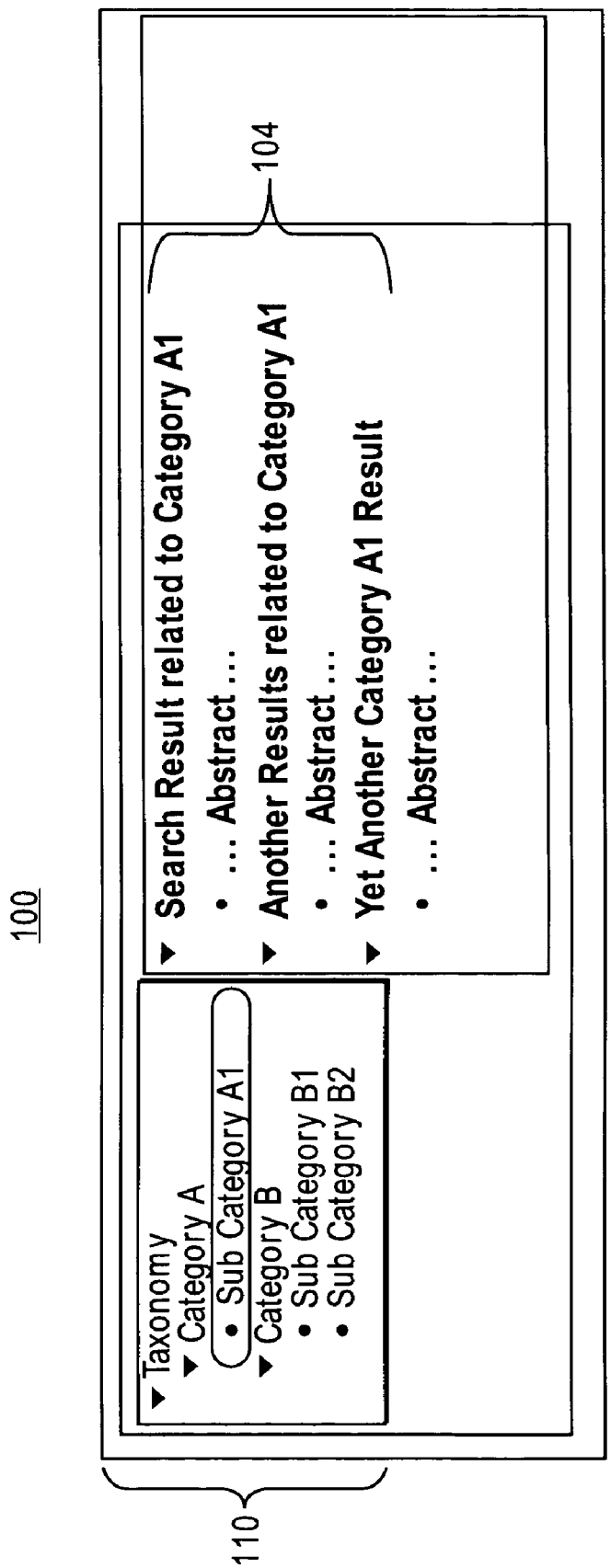
FIG. 1 is an example search engine results page based on an environment taxonomy, in accordance with an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are disclosed herein for generating a search engine results page ("SERP") that is based, at least in part, on a taxonomy that is specific to one or more of: an environment from which a search query originated, a user that submitted the search query, or the search query itself.

In one embodiment, a search engine stores different taxonomies that each specifies categories and relationships between the categories. For example, a medical-based taxonomy might have categories related to medical subject matter, whereas a financial-based taxonomy might have categories related to financial subject matter. The taxonomies might be specific to a particular environment. As an example, an environment might be an enterprise such as a corporation, but that is not required. The different taxonomies may be provided to the search engine by administrators for various environments. An environment may have multiple taxonomies associated therewith. As an example, an administrator for a particular corporation might provide the search engine with a medical taxonomy and a financial taxonomy that were each developed for the particular corporation.

When the search engine receives a request having a search query, the search engine determines which taxonomy, if any, it should use to generate a SERP. The search engine bases this determination upon information provided to it in the request, in one embodiment. For example, the request could specify the environment or other information, such as a role of the user. Thus, a medical researcher and a financial analyst for a particular corporation could receive SERPs that were generated with appropriate taxonomies for each of them.

In one embodiment, the search engine includes at least a portion of the taxonomy in the SERP. For example, the SERP includes organized presentation of categories that match the search results. Thus, the client that originated the search query displays a SERP with an arrangement of categories from taxonomy listed. If the user at the client selects one of the categories, the search engine responds by retuning search results that match that category.

In one embodiment, a proxy is interposed between the client and the search engine, such that the client sends the search query to the proxy, which the proxy forwards to the search engine. Rather than the search engine selecting the taxonomy, the search engine returns search results matching the search query to the proxy. The proxy determines an appropriate taxonomy to apply, based on information such as the search query and the user who submitted the search query. The proxy then generates a SERP based, at least in part, on the selected taxonomy. Then, the proxy provides the SERP to the client.

Example Web Page Based on Environment Taxonomy

FIG. 1 is a portion of an example SERP 100 based on an environment taxonomy, in accordance with an embodiment of the present invention. The example SERP 100 contains at least a portion of environment taxonomy 10, which contains categories and sub categories. Anytime the term category or taxonomy category is used herein, the term "category" will be understood to encompass "sub category" or the like. The portion of the environment taxonomy 110 that is rendered in the SERP 100 may be based on what search results 104 match the search query. For example, the search engine 109 determines which categories of the taxonomy 110 have at least one matching search result and only returns those categories in the taxonomy 110. However, it is not required that all categories for which matching search results exist be displayed. For example, due to practical limitations as to how many categories can be displayed in the SERP 100, only a portion of the categories with matching search results might be displayed.

The taxonomy 110 allows the user to "drill down" to desired search results. In this example, the user has selected sub category A1. In response thereto, search results 104 pertaining to category A1 are presented in the SERP 100.

Environment

As used herein, the term "environment" means any set of one or more electronic devices under common administration. The electronic devices may or may not be use the same hardware or run the same software. Examples of electronic devices include, but are not limited to, a web-enabled cellular telephone, a web-enabled personal digital assistant, a server running a particular operating system (e.g., Linux®, Solaris®), a personal computer running the Windows® operating system, etc.

The environment may have a device that controls access to the environment. In one embodiment, the environment has a proxy with a firewall to perform the access control. An administrator for the environment may control what software is loaded on the electronic devices. An example of an environment is a home, where the administrator may be any resident thereof, and the end users are the family members. Another example of an environment is a corporation, where the administrator is the information technology (IT) manager, and the end users are employees of the company. Still another example of an environment is a business, such as an Internet cafe, where the administrator may be the proprietor, and the end users are customers.

Environment Taxonomies

A taxonomy contains categories and relationships between the categories. Many different techniques may be used to relate categories to each other. An environment taxonomy is a taxonomy that is developed for a particular environment. The following examples of how a taxonomy might be organized are provided, but relationships between categories are not limited to these examples. The relationship may be hierarchical. For example, the taxonomy could be a tree structure with each leaf representing a category. However, the structure is not required to be a tree. Thus, in one taxonomy, a child category could be required to have only one parent category, whereas in another taxonomy, a child category could be permitted to have multiple parent categories. As an example, the child category "cellular telephone" might have parent categories "electronic device" and "communication device". The categories of a taxonomy might be organized into groups, without an explicit relationship between the groups. The taxonomy, or portions thereof, might be an ordered list of categories.

In addition to the categories and relationships between the categories, each category may have a rule used to determine what documents match that category. For example, a rule might be that documents pertaining to "flu vaccination" belong in that category.

However, it is not required to have an explicit rule associated with a category. For example, a category can contain a set of documents without a unique rule for assigning documents to the category. If desired, additional documents can be assigned to categories by matching new documents to documents that are already categorized. For example, a comparison of keywords can be performed. Thus, a particular category does not need to have its own unique rule to have further documents assigned to it.

The document corpus for a taxonomy can be the entire World Wide Web, any domain of the World Wide Web, or a corpus other than the World Wide Web. If the document has a Uniform Resource Locators (URLs) then that URL can be associated with the category. However, the document corpus does not have to be the World Wide Web.

System for Environment Taxonomies

Figure 2:
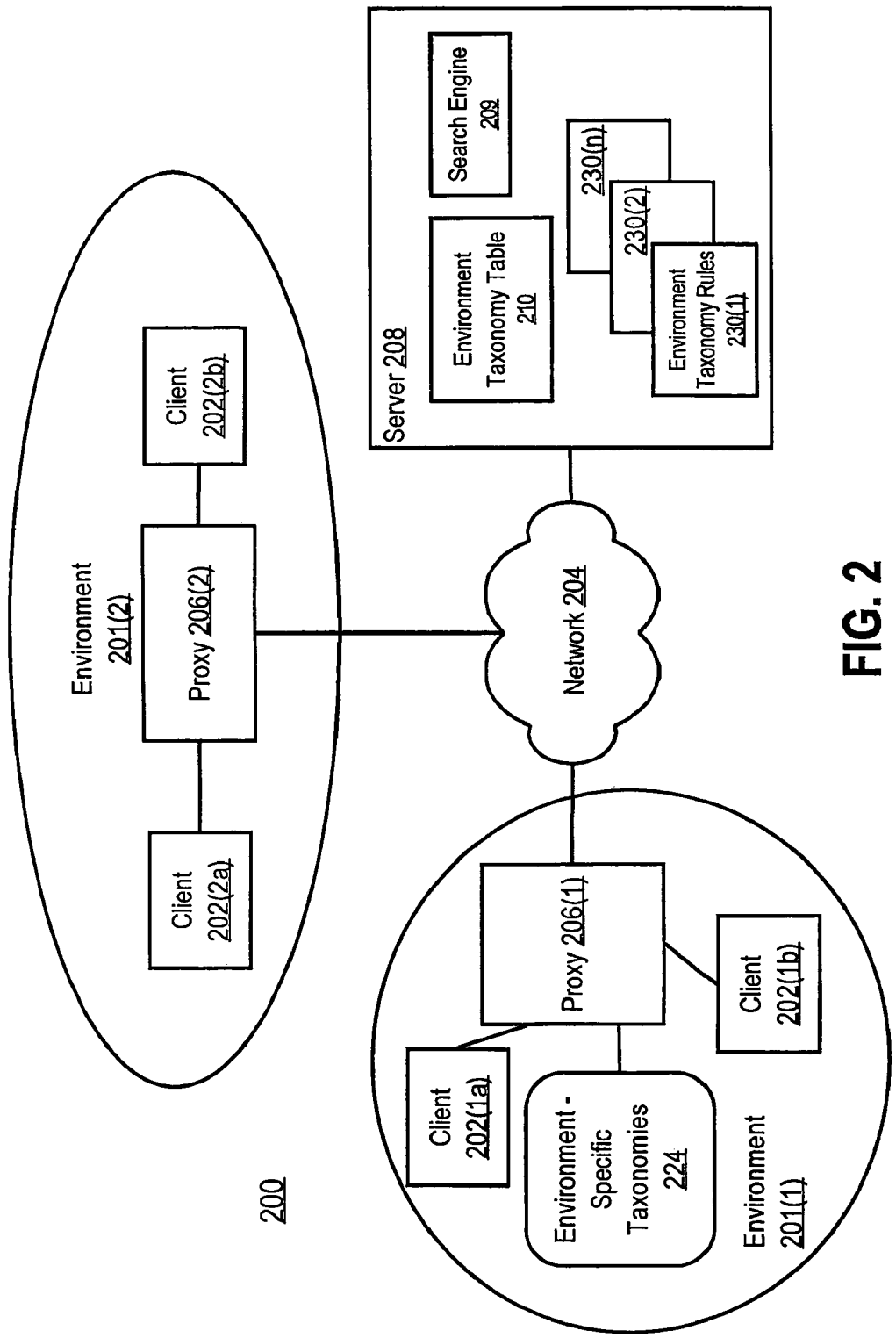
FIG. 2 illustrates a system for environment taxonomies, in accordance with an embodiment of the present invention.

FIG. 2 illustrates a system 200 for providing SERPs 100 based on environment taxonomies, in accordance with an embodiment of the present invention. Each environment 201 has one or more clients 202 communicatively coupled to the server 208 via network 204. An environment 201 may have a proxy 206, which acts as an intermediary between the client 202 and server 208. Network 204 may be the Internet, although this is not required. The server 208 has search engine 209 that is able to perform a search of the World Wide Web, in one embodiment.

When a client 202 sends a request (via the proxy 206) to the server 208, the server 208 determines what taxonomy should be used to generate a SERP 100. The server 208 makes the determination based on information such as the environment 201 from which the request originated, the user who submitted the search query, the search query itself, or other information. The proxy 206 may pass information to the server 208 to assist the server 208 in this determination. After the server 208 selects a particular taxonomy, the server 208 uses either the environment taxonomy table 210 or the environment taxonomy rules 230(1)-230(n) to generate a SERP 100 that is based on the selected taxonomy.

The environment taxonomy table 210 contains, for a number of distinct taxonomies, associations between documents (e.g., web pages) and taxonomy categories. The organization of the environment taxonomy table 210 is as follows, in one embodiment. The table 210 has a column having a document identifier (e.g., a unique URL) in each row entry. Each distinct environment taxonomy has its own column. The row entries for each specific environment taxonomy identify to which taxonomy category the URL in that row belongs. For a given environment taxonomy, not all URLs will be assigned a category. Therefore, some row entries for a given environment taxonomy will contain a null entry. To construct the table 210, the server 208 receives a mapping of URLs to categories, in one embodiment. For example, an administrator of an environment 201 provides this mapping to the server 208.

A given set of taxonomy rules (e.g., 130(1)) comprises rules to associate documents with categories. The server 208 uses a particular set of environment taxonomy rules (e.g., 230(1)) to associate documents (e.g., search result items) with categories for a particular environment taxonomy, in one embodiment. The server 208 may apply the rules 130 to search results "on-the-fly". Associations between documents and categories that are learned "on-the-fly" may be stored in an appropriate column of the environment taxonomy table 210 for later reference. However, the server 208 may apply the rules 130 to documents other than when search results are being processed.

Note that regardless of whether the search engine uses the table 210 or the rules 230 not all search result items will match a category in the selected taxonomy. In this case, the server 208 may still return these "un-categorized" search result items in a SERP 100.

A proxy 206 may have access to environment specific taxonomies 224, although this is not required. For example, proxy 206(1) has access to environment specific taxonomies 224. Using one of the environment specific taxonomies 224, proxy 206(1) is able to generate a SERP 100. As an example, proxy 206(1) receives a SERP 100 from search engine 209 and adds a list of taxonomy categories to the SERP 100. Thus, an environment 201 does not need to share its environment specific taxonomy 224 with the server 208.

Example Process Flow for Server-Side Taxonomies

Figure 3:
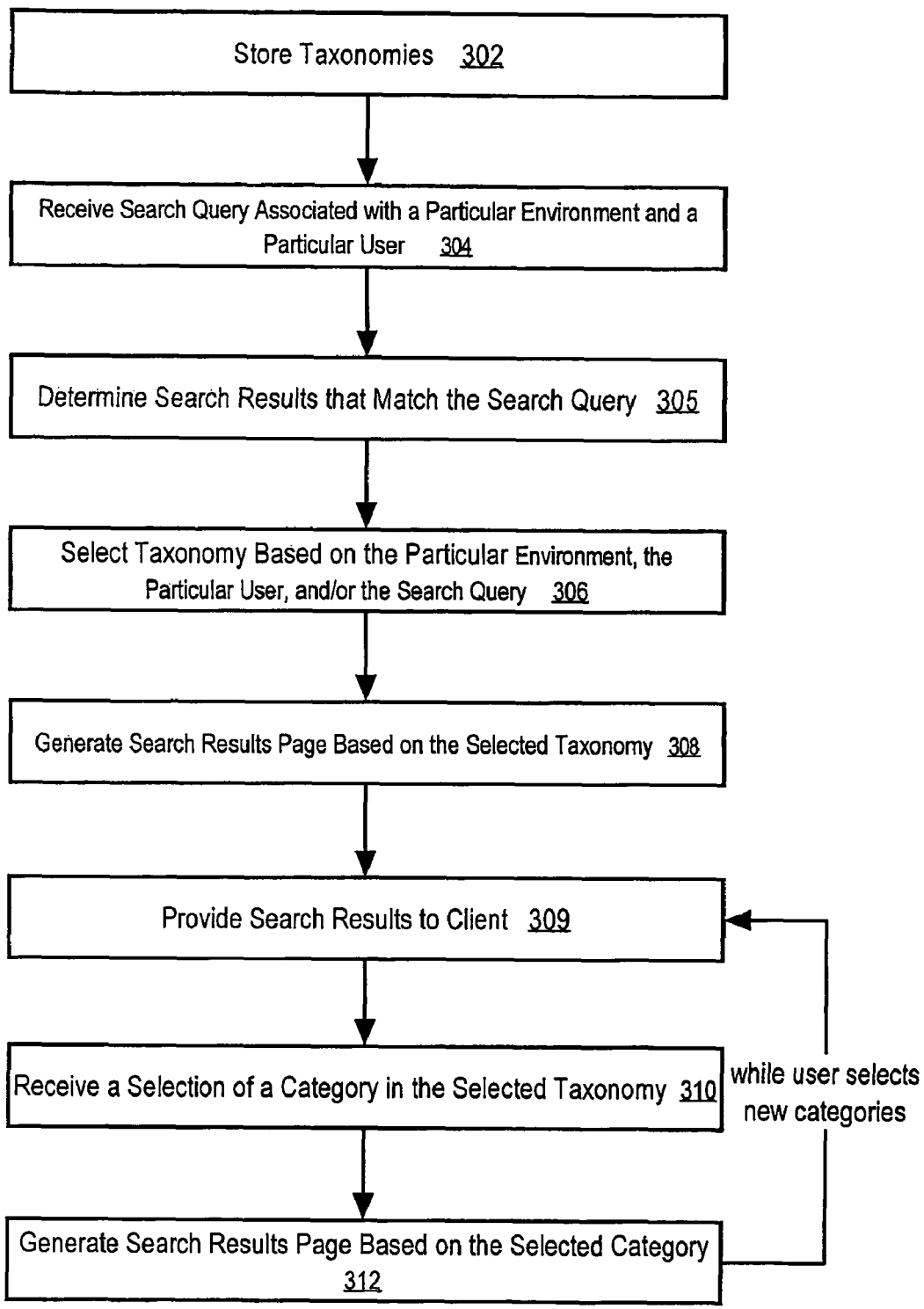
FIG. 3 is a flowchart of generating a search engine results page using environment taxonomies, in accordance with an embodiment of the present invention.

FIG. 3 is a flowchart illustrating a process 300 of server-side environment taxonomies, in accordance with an embodiment of the present invention. FIG. 3 will be described with reference to the system 200 of FIG. 2 and the example web page 100 of FIG. 1. However, the process 300 of FIG. 3 is neither limited to system 200, nor to example web page 100.

In step 302, the server 208 stores distinct taxonomies. The server 208 receives taxonomies from the different proxies 206, in one embodiment. In one embodiment, for a particular environment taxonomy, the server 208 receives and stores a set of taxonomy rules 230 that can be used to associate search result items into taxonomy categories. In another embodiment, for a particular environment taxonomy, the server 208 receives and stores document identifiers (e.g., a URL) that are associated with taxonomy categories.

In step 304, the server 208 receives a request containing a search query that originated from a user associated with a particular environment 201. The request may be forwarded to the server 208 from a proxy 206 in the particular environment 201. The proxy 206 may provide information that can be used to select a taxonomy to apply to a SERP 100. For example, the proxy 206 may provide an environment identifier to select the taxonomy. As another example, the proxy 206 provides a user role (e.g., engineer, manager, financial analyst, etc.).

In step 305, the server 208 passes the search query to the search engine 209, which determines matching search results for the search query.

In step 306, the server 208 selects a taxonomy based, at least in part, on one or more of: the particular environment 201, the user who submitted the search query, and the search query itself. As an example, the server 208 might select a different taxonomy for a user whose role is "engineer" than a user whose role is "finance". For example, the server 208 might select a medical taxonomy that was specifically developed to meet the needs of a pharmaceutical company in response to determining that a medical researcher for that pharmaceutical company submitted the search query. The server 208 may use other factors to select the taxonomy, such as terms in the search query.

In step 308, the server 208 generates a SERP 100 based, at least in part, on the selected taxonomy. The server 208 includes at least a portion of the selected taxonomy in the SERP 100, in one embodiment. For example, if there is a least one search result item that matches a particular category, then that category is a candidate for inclusion in the SERP 100. However, due to the large number of categories this may cover, only a portion of these candidate categories need be included in the SERP 100. Because only a fraction of the search results are returned in a single SERP, many of the categories will not have a corresponding search result item in the SERP 100.

In step 309, the SERP 100 are provided to the proxy 206, which passes them on to the client 202. It is possible, though not required, for the proxy 206 to modify the SERP 100 prior to forwarding to the client 202. An embodiment in which the proxy 206 performs such a modification is described below. A user at the client 202 may select one of the categories in the taxonomy displayed in the SERP 100, and submit this to the server 208.

In step 310, server 208 receives the category selection. In step 312, the search engine 209 generates a SERP 100 based, at least in part, on the selected category. For example, the search engine 209 determines a set of search result items that match the selected category, wherein those search result items are provided to the client 202, in step 309. Process 300 may continue by repeating steps 309-312, as long as the user selects new categories.

Example Process Flow for Proxy-Side Taxonomies

Figure 4:
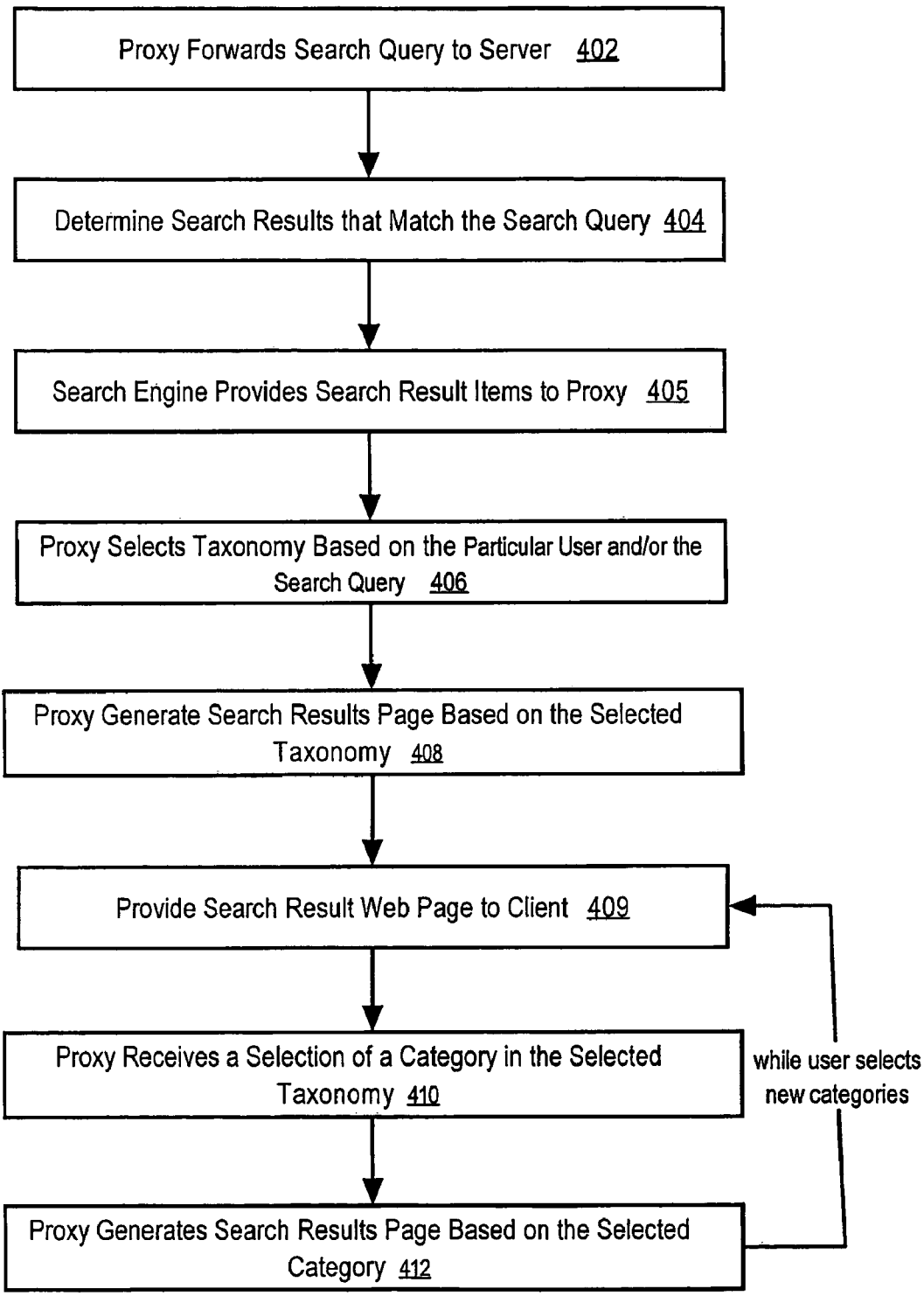
FIG. 4 is a flowchart of generating a search engine results page using environment taxonomies, in accordance with another embodiment of the present invention.

FIG. 4 is a flowchart illustrating a process 400 of proxy-side environment taxonomies, in accordance with an embodiment of the present invention. FIG. 4 will be described with reference to the system 200 of FIG. 2 and the example web page 100 of FIG. 2. However, the process of FIG. 4 is neither limited to system 200, nor to example web page 100.

In step 402, the proxy 206 receives a request containing a search query from a client 202 and forwards the request to the server 208. The proxy 206 need not provide any information to assist the server 208 in selecting a taxonomy, as the server 208 does not select a taxonomy, in this embodiment. However, the proxy 206 may request that the server 208 return more search results at a time that can fit into a single web page.

In step 404, the server 208 passes the search query to the search engine 209, which determines matching search results for the search query. In step 405, the server 208 returns search results to the proxy 206. As previously discussed, a server 208 might provide the proxy 206 with enough search result items to fill many web pages 100.

In step 406, the proxy 206 selects a taxonomy based, at least in part, on the user who submitted the search query and/or the search query itself.

In step 408, the proxy 206 generates a SERP 100 based, at least in part, on the selected taxonomy and the search result items. The proxy 206 includes at least a portion of the selected taxonomy in the SERP 100, in one embodiment.

In step 409, the SERP 100 are provided to the client 202. A user at the client 202 may select one of the categories in the taxonomy displayed in the SERP 100, and submit this to the server 208.

In step 410, proxy 206 receives the category selection. In step 412, the proxy 206 generates a SERP 100 based, at least in part, on the selected category. In one embodiment, the proxy 206 determines a set of search result items that match the selected category from the search result items that were previously provided by the server 208. The proxy 206 then provides the SERP 100 to the client 202, in step 409. Process 400 may continue by repeating steps 409-412, as long as the user selects new categories.

Hardware Overview

Figure 5:
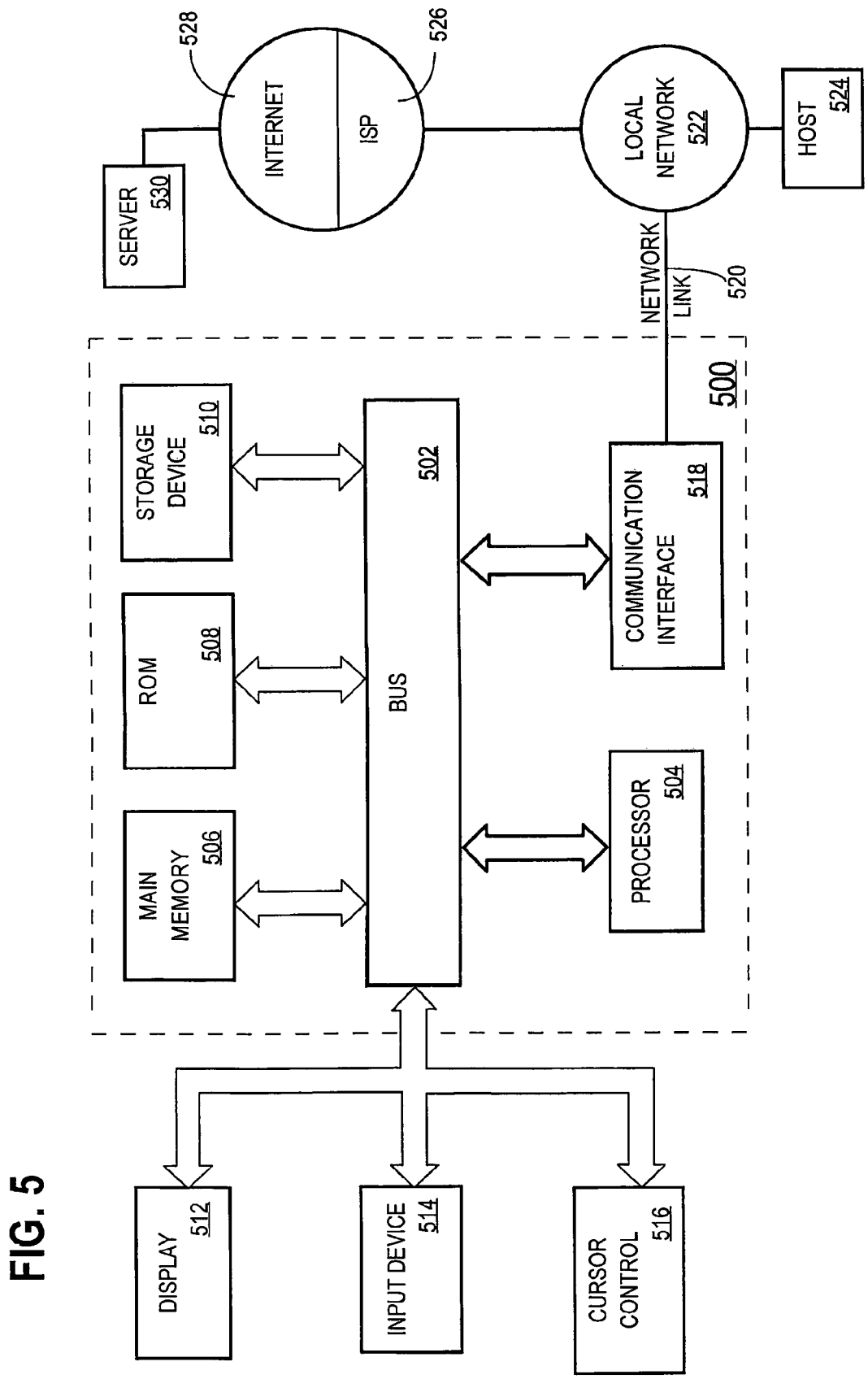
FIG. 5 is a block diagram that illustrates a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   a search engine receiving one or more distinct taxonomies and an environment identifier from an administrator of an environment;
   storing taxonomies received from a plurality of environments, wherein each taxonomy of the one or more distinct taxonomies is stored in association with the environment identifier;
   wherein said each taxonomy specifies categories and relationships between the categories;
   receiving a search query;
   determining a particular environment identifier of a particular environment that is associated with the search query;
   selecting one of a plurality of taxonomies stored in association with the particular environment identifier;
   generating a search engine results page, at least in part, by applying to a search engine result item a set of rules that are associated with the selected taxonomy;
   wherein applying the set of rules to a search engine result item identifies a set of categories in the selected taxonomy to display on the search engine results page in association with the search engine result item;
   wherein the method is performed by a computer programmed to be a special purpose machine pursuant to instructions from program software.

2. The method of claim 1, wherein generating the search engine results page comprises including a description of at least a portion of the selected taxonomy in the search engine results page.

3. The method of claim 1, further comprising:
   providing the search engine results page to a client in the particular environment;
   receiving, from the client, a selection of a category in the selected taxonomy; and
   generating an additional search engine results page based, at least in part, on the selected category.

4. The method of claim 1, wherein storing taxonomies comprises storing, for said each taxonomy, a set of rules that define how documents are to be associated with categories in said each taxonomy.

5. The method of claim 1, wherein storing taxonomies comprises storing, for said each taxonomy, associations between documents and categories in said each taxonomy.

6. The method of claim 1, wherein generating the search engine results page comprises accessing a table that stores associations between documents and categories in the selected taxonomy.

7. The method of claim 1, wherein selecting a particular taxonomy of the plurality of taxonomies is based, at least in part, on a particular user role within the particular environment.

8. The method of claim 1, wherein selecting the taxonomy is based, at least in part, on the search query.

9. A method comprising:
   receiving one or more distinct taxonomies from an administrator of an environment;
   wherein the one or more distinct taxonomies are specific to the environment;
   receiving a search query from a client in the environment;
   forwarding the search query to a search engine;
   receiving, from the search engine, search result items that match the search query;
   wherein identifying search result items is performed independent of any taxonomy;
   selecting from a plurality of taxonomies, a taxonomy that is specific to the environment;
   wherein the taxonomy specifies categories and relationships between the categories;
   generating, for the client, a search engine results page that is based, at least in part, on the search result items and the taxonomy that is specific to the environment; and
   providing, to the client, the search engine results page;
   wherein the method is performed by a computer programmed to be a special purpose machine pursuant to instructions from program software.

10. The method of claim 9, further comprising selecting the taxonomy based, at least in part, on one or more of:
    a particular user that submitted the search query; and
    the search query.

11. The method of claim 9, wherein generating the search engine results page comprises including a description of at least a portion of the taxonomy in the search engine results page.

12. The method of claim 9, further comprising determining into which category of the taxonomy to place a search result item that matches the search query based, at least in part, on the taxonomy.

13. The method of claim 9, further comprising:
    receiving, from the client, a selection of a category in the taxonomy; and
    providing, to the client, a new search engine results page based, at least in part, on the selected category.

14. The method of claim 13, further comprising determining search result items that match the search query and are members of the selected category.

15. The method of claim 9, further comprising forwarding to the search engine, along with the search query, a request for the search engine to return sufficient search result items to fill multiple search engine results pages.

16. A machine-readable volatile or non-volatile medium storing one or more sequences of instructions, which when executed by one or more processors causes the one or more processors to perform:
   a search engine receiving one or more distinct taxonomies and an environment identifier from an administrator of an environment;
   storing taxonomies received from a plurality of environments, wherein each taxonomy of the one or more distinct taxonomies is stored in association with the environment identifier;
   wherein said each taxonomy specifies categories and relationships between the categories;
   receiving a search query;
   determining a particular environment identifier of a particular environment that is associated with the search query;
   selecting one of a plurality of taxonomies stored in association with the particular environment identifier; and
   generating a search engine results page, at least in part, by applying to a search engine result item a set of rules that are associated with the selected taxonomy;
   wherein applying the set of rules to a search engine result item identifies a set of categories in the selected taxonomy to display on the search engine results page in association with the search engine result item.

17. The machine-readable volatile or non-volatile medium of claim 16, wherein the one or more sequences of instructions, which when executed by the one or more processors causes the one or more processors to perform:
   accessing a table that stores associations between search result items and categories in the selected taxonomy.

18. An apparatus comprising:
   a processor; and
   a storage device coupled to the processor, wherein the storage device stores one or more sequences of instructions, which when executed by the processor causes the processor to perform:
   a search engine receiving one or more distinct taxonomies and an environment identifier from an administrator of an environment;
   storing taxonomies received from a plurality of environments, wherein each taxonomy of the one or more distinct taxonomies is stored in association with the environment identifier;
   wherein said each taxonomy specifies categories and relationships between the categories;
   receiving a search query;
   determining a particular environment identifier of a particular environment that is associated with the search query;
   selecting one of a plurality of taxonomies stored in association with the particular environment identifier; and
   generating a search engine results page, at least in part, by applying to a search engine result item a set of rules that are associated with the selected taxonomy;
   wherein applying the set of rules to a search engine result item identifies a set of categories in the selected taxonomy to display on the search engine results page in association with the search engine result item.

19. The apparatus of claim 18, wherein the one or more sequences of instructions, which when executed by the processor causes the processor to perform:
   accessing a table that stores associations between search result items and categories in the selected taxonomy.

20. The method of claim 1, wherein generating a search engine results page includes:
   (a) identifying search results independent of the taxonomy; and
   (b) providing to a client the search engine results based on the taxonomy.

21. The method of claim 1, further comprising receiving one or more distinct taxonomies and a first environment identifier that identifies a first environment;
   wherein the one or more distinct taxonomies comprises categories of subject matter relevant to the first environment;
   storing said one or more distinct taxonomies in association with said first environment identifier;
   receiving and storing a second set of one or more distinct taxonomies in association with a second environment identifier that identifies a second environment;
   wherein the second set of one or more distinct taxonomies comprises categories of subject matter relevant to the second environment;
   wherein said each taxonomy specifies categories and relationships between the categories.

22. The method of claim 1, further comprising creating a set of search result items by matching the search query against a set of documents indexed by a web search engine;
   wherein matching performed is independent of a taxonomy.

* * * * *